US008474598B2

(12) United States Patent  (10) Patent No.: US 8,474,598 B2
Huber et al.  (45) Date of Patent: Jul. 2, 2013

(54) DEVICE AND METHOD FOR COMPOSING PACKAGES FOR A PACKAGING MACHINE

(76) Inventors: Wolfgang Huber, Grafing (DE);
Manuel Kollmuss, Riedering (DE);
Richard Eschlbeck, Vogtareuth (DE);
Christoph Klenk, Wenzenbach (DE)

( * ) Notice: Subject to any disclaimer, the term of this patent is extended or adjusted under 35 U.S.C. 154(b) by 51 days.

(21) Appl. No.: 12/969,740

(22) Filed: Dec. 16, 2010

(65) Prior Publication Data

US 2011/0083939 A1  Apr. 14, 2011

Related U.S. Application Data

(63) Continuation of application No. PCT/EP2009/054608, filed on Apr. 17, 2009.

(30) Foreign Application Priority Data

Jun. 20, 2008  (DE) .................... 10 2008 029 497

(51) Int. Cl.
  *B65G 47/26* (2006.01)
(52) U.S. Cl.
  USPC ........................................ 198/426; 198/429
(58) Field of Classification Search
  USPC .................. 198/418.1, 418.7, 426, 429, 430, 198/443
  See application file for complete search history.

(56) References Cited

U.S. PATENT DOCUMENTS

| 1,822,336 | A | * | 9/1931 | Burns ........................ 198/550.3 |
| 2,526,983 | A | * | 10/1950 | Wait .............................. 198/429 |
| 4,043,442 | A | * | 8/1977 | Greenwell et al. ......... 198/418.1 |
| 4,630,428 | A | | 12/1986 | Lesch |
| 5,133,446 | A | | 7/1992 | Draghetti |
| 5,456,563 | A | | 10/1995 | Halbo |
| 5,653,328 | A | * | 8/1997 | Pedrotto ..................... 198/418.1 |
| 5,779,023 | A | * | 7/1998 | Hidai et al. ................ 198/418.1 |
| 6,360,871 | B1 | | 3/2002 | Meyer et al. |
| 6,374,984 | B1 | | 4/2002 | Nagler |
| 7,128,217 | B2 | * | 10/2006 | Henry ........................ 198/418.7 |
| 7,255,218 | B2 | * | 8/2007 | Yoda ............................. 198/448 |

FOREIGN PATENT DOCUMENTS

| DD | 4121978 | 4/1990 |
| DE | 1066478 | 10/1959 |
| DE | 2408158 | 8/1975 |
| DE | 19752908 | 6/1978 |
| DE | 4243010 | 12/1992 |
| DE | 4207725 | 9/1993 |
| DE | 4208818 | 9/1993 |
| DE | 197529087 | 11/1997 |
| DE | 29807979 | 5/1998 |
| EP | 0162933 | 4/1984 |
| EP | 0856465 | 8/1998 |

* cited by examiner

*Primary Examiner* — James R Bidwell

(74) *Attorney, Agent, or Firm* — Jason T. Daniel, Esq.

(57) ABSTRACT

The invention provides a device (1) having at least one inlet conveyor belt (3) for loose, un-grouped articles (5), and at least one grouping device (7) for the loose, un-grouped articles (5) for the orderly composing of articles. An outlet conveyor belt (9) is associated with the grouping device (7), said outlet conveyor belt (9) feeding the articles thereon grouped without containers to a packaging device (10). The invention also provides a method for composing packages for a packaging machine.

19 Claims, 4 Drawing Sheets

DEVICE AND METHOD FOR COMPOSING PACKAGES FOR A PACKAGING MACHINE

CROSS REFERENCE TO RELATED APPLICATIONS

This application is filed under 35 U.S.C. §120 and §365(c) as a continuation of International Patent Application PCT/EP2009/054608, filed Apr. 17, 2009, which application claims priority from German Patent Application No. DE 10 2008 029 497.7, filed on Jun. 20, 2008, which applications are incorporated herein by reference in their entireties.

FIELD OF THE INVENTION

The present invention relates to a device for the ordered composition of articles.

Furthermore, the invention relates to a method for the ordered composition of articles.

BACKGROUND OF THE INVENTION

The German patent application DE 42 08 818 A1 discloses a method and an apparatus for placing articles into packaging trays. The articles are supplied on an infeed conveyor and their position is determined by an image processing system. A computer controlled suction and/or gripping device seizes the recognized article and transfers it to a particular position on the conveyor belt. In order to increase the speed of placement of articles into the containers, at least a second suction and/or gripping device is provided. The articles to be placed, however, need to be placed at an ordered position into compartments of the containers on the conveyor belt.

The examined German patent application 1066478 discloses a machine for inserting containers into a common packaging container. For holding the containers during the compilation of the respective group of containers a fixed platform extending to the edge of the loading gap is provided. The loading gap consists of plural bars at a lateral distance from each other. The loading platform, movable back and forth, comprises plural longitudinally extended carriers arranged between the bars of the fixed platform, which are arranged on the head of the feeding device at a distance one next to the other, and which are, by means of the feeding device, movable in a plane somewhat below the surface of the fixed platform between a retracted state, in which they are within the fixed platform, and an advanced state, in which they extend beyond the ends of the bars forming the fixed platform over the loading gap. This apparatus however is very much geared towards the size of the groups to be compiled. With this apparatus there is no variability.

The European patent 0162933 discloses a method and an apparatus for the ordered placement of objects, in particular chocolates, into containers. Plural feeding conveyors are provided, each of which transports a different type of article. The containers, into which the articles are to be placed, pass the conveyor belts in such a way that the articles are placed into the respective compartments provided for them in the container. A variable placement, or a variable grouping of the articles, respectively, is not possible with this apparatus, either. If different containers are used, the apparatus has to be adequately adapted in terms of mechanics or software.

The German utility model DE 29807979 U1 discloses an apparatus for grouping or decollating articles. The articles are transported in one or plural dense files on a conveyor belt or the like. For further processing the articles are separated individually or in groups. To this end elements that can move back and forth in the direction of transport are provided, which can engage or disengage the articles in a controlled manner. Thus the individual articles may, depending on the requirements, be grouped or decollated for further transport, for example to a packaging machine.

However, this apparatus, too, is suitable for the processing of one type of article only. If plural types of articles, or different sizes of articles, are to be processed, the machine has to be adapted in each case. This obviously increases the machine downtime of a downstream processing machine.

The German patent application DE 4207725 discloses a method and an apparatus for packaging objects in a continuously running process. The objects are distributed in groups for packaging. Each of these groups is combined into a handling unit by packaging. During the entire packaging process each group is supported at least at the front and back with respect to the direction of transport.

The European patent EP 0856465 B1 discloses an apparatus and a method for placing articles in containers. The individual products are supplied un-ordered on an infeed conveyor. Counterstream to the infeed conveyor the containers are supplied also on at least one conveyor. Furthermore gripping systems are provided, which seize the un-ordered articles on the infeed conveyor and place them in the corresponding containers in the respective compartments provided.

The German patent DE 4243010 C1 discloses a packaging machine. Packing and unpacking of articles into or out of handling units is possible with the packaging machine. The packaging machine is provided with at least one controllable gripping element which is moving continuously on a closed path. The gripping element exhibits a packing head, which seizes the handling unit and displaces it accordingly. Empty handling units for the packing of articles and handling units filled with articles for unpacking are supplied to the packaging machine simultaneously, wherein during a complete revolution of the packing head the articles are taken from a handling unit supplied, placed on the article conveyor, and articles supplied to the packaging machine are placed into empty handling units supplied. The apparatus is not useable variably without an adaptation, either.

SUMMARY OF THE INVENTION

It is an object of the invention to provide a device for making a plurality of types of articles ready for packaging without disruptions, wherein the necessary change-over times for the processing of different types of articles can be avoided.

This object is achieved by a device for the ordered composition of articles comprising: at least one infeed conveyor for loose, un-grouped articles; at least one grouping unit for the loose, un-grouped articles; and a discharge conveyor assigned to the grouping unit which feeds the articles grouped without containers on the discharge conveyor to a packaging unit.

The above object is achieved as well by a device the ordered composition of articles comprising: at least one infeed conveyor for loose, un-grouped articles; at least one grouping unit for the loose, un-grouped articles; a discharge conveyor assigned to the grouping unit which feeds the articles grouped without containers on the discharge conveyor to a packaging unit and wherein the at least one grouping unit is arranged such that it spans the at least one infeed conveyor and the discharge conveyor.

It is a further object of the invention to provide a method for the ordered composition of articles, wherein different types and sizes of articles can be processed with the method, without incurring machine downtimes due to change-overs. Furthermore the method according to the invention is to facilitate processing of the individual articles without disruptions.

This object is achieved by the method for the ordered composition of articles, comprising the following steps:
- feeding loose, un-grouped articles to at least one grouping unit by at least one infeed conveyor;
- placing the articles onto a discharge conveyor one after the other ordered in plural containerless groups by the grouping unit, wherein the at least one grouping unit is arranged such that it spans the at least one infeed conveyor and the discharge conveyor; and
- feeding articles in containerless groups to a packaging unit by the discharge conveyor.

The device according to the invention has the advantage that it avoids the disadvantages of packaging machines up to now in the market. These packaging machines exhibit a product infeed unit, which, in a known fashion, supplies the products, like for example bottles, cans, coffee packages, sugar packages, soft packages or similar suitable handling units, in a stream. The products then are forced into single lanes by a guide surface upstream of the packaging machine, in order to supply the products to the packaging machine guided in lanes. The products guided in the individual lanes then are divided into a particular format in the packaging machine with respect to the direction of transport through the packaging machine. Usually this is done inside the packaging machine by a so-called container separator, which, by means of a finger rising from below, separates the products and thus forms single handling unit groups, like for example six bottles. The separated product groups then are, by means of individual transport lanes and a motor driven transport means, transported further through the machine and, in some cases, wrapped in a foil. Other packaging articles, like cardboard or other suitable material, may be supplied in the packaging machine.

As already mentioned above, these packaging machines require a downtime for change-over if different articles are to be packed, in order to adapt the machines to the different size of the objects to be packed. Furthermore, the packaging machines are able to process articles or products of one type only.

The present invention is advantageous, as loose, un-grouped articles are supplied on at least one infeed conveyor, and at least one grouping unit is provided, which groups these loose and un-grouped articles in a corresponding fashion on a discharge conveyor. The articles grouped without containers on the discharge conveyor are fed to a packaging unit by the discharge conveyor. In the packaging unit these grouped articles are eventually combined into grouped packs. In the state of the art a plurality of possibilities is known, how grouped articles can be combined into grouped packs. For example, this can be done with only a foil. It is also possible for the articles to be placed or set on a support pad, which then forms part of the completed handling unit leaving the packaging machine. This applies not only to support pads, but also to trays which are unfolded in the packaging machine. The support pads may be cut from cardboard or plastic. In the packaging machine wrap-around packages are produced from the flat cuts, with the articles grouped on the flat support pads. In the packaging machine the flat support pads are folded to form a closed container and glued.

According to the invention the infeed conveyor and the discharge conveyor exhibit an identical direction of transport. It is also conceivable for the infeed conveyor to be arranged at an angle with respect to the discharge conveyor. It is a particular advantage, if the infeed conveyor is arranged at a right angle to the discharge conveyor.

It is also conceivable for the infeed conveyor to supply the loose, un-grouped articles to the grouping unit in an unordered fashion in at least one lane. Eventually it is important that the infeed conveyor supplies the loose, un-grouped articles to the grouping unit in an unordered fashion. As no guiding elements are provided in the infeed conveyor, it is possible that different types of articles or article sizes, respectively, can quickly be processed without a change-over of the device.

In an advantageous embodiment the device is provided with a return line. The return line serves for feeding back articles to the infeed conveyor which have not been transferred to the discharge conveyor by the grouping unit. Feeding back to the infeed conveyor by means of the return line occurs upstream of the grouping unit, or upstream of the grouping units, respectively, which are responsible for the transfer of the articles to or for the grouping of the articles on the discharge conveyor.

Also, a magazine for support pads can be assigned to the device. By a handling system at least one support pad is removed from the magazine and placed on the discharge conveyor. The handling system for example can be a further grouping unit. Eventually the articles are grouped on the support pad by the grouping unit. The grouping units can be gantry robots, which are moved by linear guides, or free-standing robots.

If the grouping unit is a robot, the discharge conveyor and the infeed conveyor are located in the operating range of the at least one robot. It is obvious that depending on the velocity of the infeed conveyor or on the number of articles supplied thereon, plural grouping units, or robots, respectively, may be provided, so that the placement and the grouping of the articles on the discharge conveyor can be done in such a way that no congestion of the articles occurs on the infeed conveyor. If support pads are to be used for the grouping of the articles on the discharge conveyor as well, it is advantageous to provide a magazine for these support pads in the operating range of the robot, too.

The method according to the invention for the ordered composition of articles is advantageous, because loose, un-grouped articles are fed to at least one grouping unit by at least one discharge conveyor. The grouping unit places the articles one after the other in plural containerless groups on a discharge conveyor. By the discharge conveyor the articles in containerless groups are fed to a packaging unit.

Grouped packs comprising plural articles are produced with the device according to the invention or with the method according to the invention, respectively. To this end the articles compiled in an ordered fashion without containers are supplied to a grouped pack, which produces the grouped pack out of the articles compiled in an ordered fashion without containers. A grouped pack is a firm connection of at least two articles. The firm connection for example is achieved by wrapping the plural articles with a foil. Further known methods are sufficiently known from the state of the art.

The method according to the invention and the device according to the invention are extremely variable, so that for example grouped packs out of at least two different types of articles can be produced. Of course it is also possible for all articles of a grouped pack to consist of like articles. Therefore at any time articles of not only a single type can be processed.

Features of advantageous embodiments of the invention are evident from the respective dependent claims.

BRIEF DESCRIPTION OF THE DRAWINGS

Below embodiments shall illustrate in greater detail the device according to the invention, the method according to the invention, and their advantages with reference to the figures provided.

DETAILED DESCRIPTION OF THE INVENTION

Figure 1:
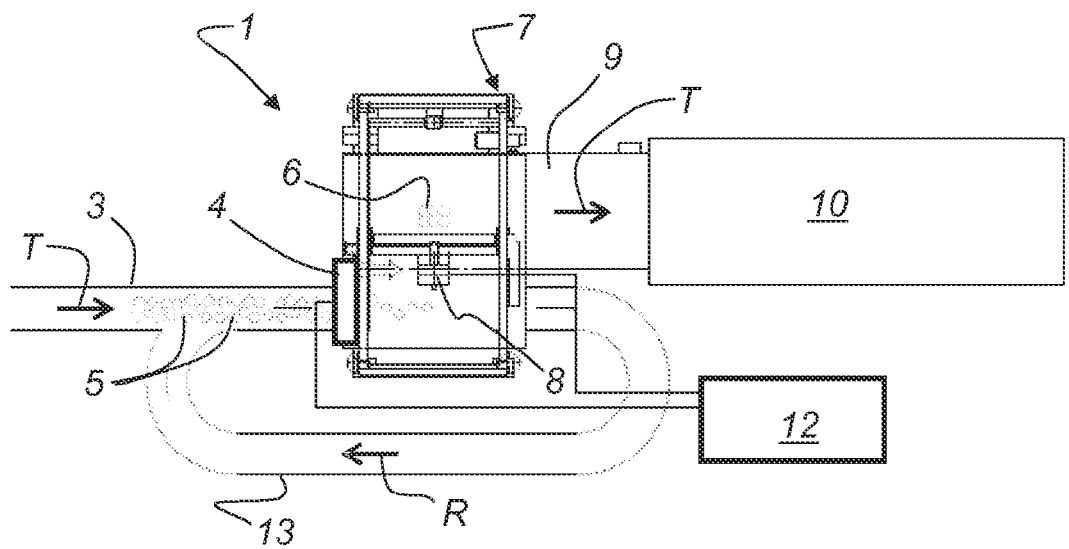
FIG. 1 shows an embodiment of the device for the ordered compilation of articles.

Identical reference numerals are used for like elements of the invention or elements of like function. Furthermore, for the sake of clarity only those reference numerals are shown in the individual figures which are necessary for the description of the respective figure. The embodiments shown merely are examples of how the device according to the invention or the method according to the invention can be realized, and do not constitute a definitive limitation.

The embodiment shown in FIG. 1 of the device 1 for the ordered composition of articles exhibits an infeed conveyor 3 transporting articles 5 along a direction of transport T to a grouping unit 7. The grouping unit 7 serves to seize the articles 5 supplied on the infeed conveyor 3 and to transfer them onto a corresponding discharge conveyor 9. In case the infeed conveyor 3 and the discharge conveyor 9 are in one plane, transferring the articles is to be also understood as pushing the articles from the infeed conveyor 3 over to the discharge conveyor 9. The discharge conveyor 9 also moves in the same direction of transport T as the infeed conveyor 3. It is self-evident that the grouping unit 7 comprises an image capture system or a detector system by which the number and the position of the supplied un-grouped articles 5 on the infeed conveyor 3 are detected. The grouping unit exhibits a gripper head 8 which seizes at least one article 5 and then places it onto the discharge conveyor 9. In the embodiment shown in FIG. 1 the articles 5 are compiled in such a way on the discharge conveyor 9 that the grouped articles 6 form a group of six articles. The articles are supplied to a packaging unit 10 by the discharge conveyor 9.

Although the process of packaging the ordered articles 6 on the discharge conveyor 9, as occurring in the packaging unit 10, is not relevant to the invention, it shall nonetheless be described here for the sake of completeness. The grouped articles 6 on the discharge conveyor 9 enter the packaging unit 10 one after the other. There they can be combined to firm grouped packs with diverse packaging material, according to choice. The articles to be packaged for example can be cardboard boxes, soft packages, bottles, cans or the like. These articles are packaged individually or in groups, for example with a sheet of shrinking foil. It is also possible that the articles to be packaged are placed in an ordered fashion on a support pad, like for example a cardboard. In the packaging machine 10 the articles 6 placed and ordered on the support pad, like for example a cardboard, are combined into a firm grouped pack, which is put in this form to the retail market.

The embodiment shown in FIG. 1 of the device for the ordered composition of articles, which only showed one grouping unit 7, is not to be taken as a limitation of the invention. It is obvious to a person skilled in the art that plural grouping units 7 can be connected in series in order to keep up with the stream of un-ordered articles 5 supplied by the infeed conveyor 3, and to place these in a corresponding ordered fashion onto the discharge conveyor 9. It is also possible to provide the infeed conveyor 3 with a return line 13. Via the return line 13 the un-grouped articles 5 supplied to the grouping unit 7 by the infeed conveyor 3 are resupplied to the infeed conveyor 3, if the grouping unit 7 cannot keep up with the plurality of supplied un-grouped articles 5. The return line 13 supplies the articles 5 to the infeed conveyor 3 upstream of the grouping unit 7. The return line 13 exhibits a direction of transport R, which essentially is opposite the direction of transport T of the infeed conveyor 3 and of the discharge conveyor 9.

The image capture system or the detector system 4 is connected to an evaluation and control unit 12. By means of the evaluation and control unit 12 s the velocity of the infeed conveyor 3 and of the discharge conveyor 9 can be controlled. Furthermore the gripper head 8 of the grouping unit 7 is controlled by the evaluation and control unit 12, in order to seize the articles on the infeed conveyor 3 and to place them at the intended position on the discharge conveyor 9. The grouping of articles on the discharge conveyor 9 may also be monitored by an image capture system or a detector system (not shown here).

Figure 2:
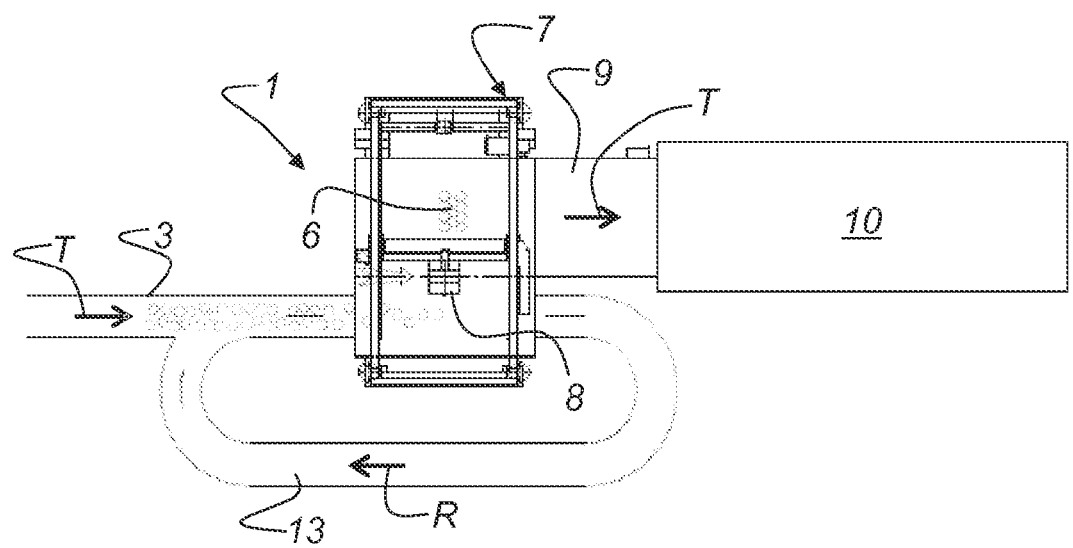
FIG. 2 shows an embodiment of the device for the ordered compilation of articles as shown in FIG. 1, wherein the articles are grouped differently.

FIG. 2 shows a further possibility of how the articles 6 grouped without containers on the discharge conveyor 9 can be arranged. Contrary to the representation in FIG. 1 the formation of the articles 6 grouped without containers in FIG. 2 is larger than in FIG. 1. This is only to illustrate that, depending on the programming of the grouping unit or of the device 1 for the ordered composition of articles 6, arbitrary shapes of the articles 6 grouped without containers can be generated. Likewise it is obvious that plural articles of different types can be supplied by the infeed conveyor 3. Thus groups consisting of plural types of articles 6 can be formed by the device 1 for the ordered composition of articles. It is also possible that an add-on article is added to a group of articles 6 grouped without containers and already arranged on the discharge conveyor 9. The variability of the device 1 for the ordered compilation of articles thus is unlimited. The various articles 6 which are supplied on the infeed conveyor 3 can be detected by the image capture system or detector system, respectively, and the grouping unit 7, depending on the requirements, can seize the respective article and place it and further articles 6 onto the discharge conveyor according to an arbitrary, user-defined pattern.

Figure 3:
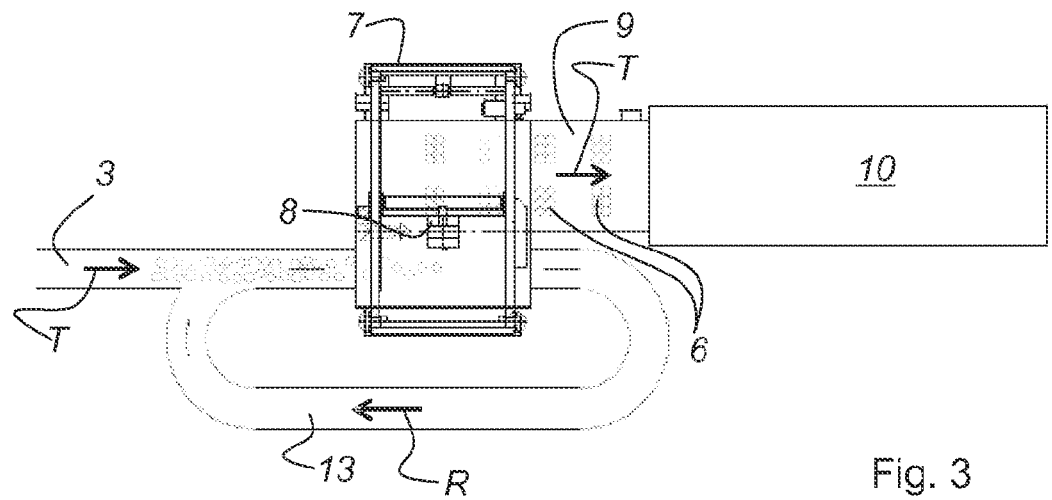
FIG. 3 shows a further possibility for the grouping of the articles on a discharge conveyor.

FIG. 3 shows a further embodiment of the device for the ordered composition of articles 6. In this embodiment the articles grouped without containers on the discharge conveyor 9 are compiled to plural groups arranged one next to the other. These groups are fed to the packaging machine 10 by the discharge conveyor 9 and there are converted to individual fixed handling units. The grouping unit 7 spans the infeed conveyor 3 and the discharge conveyor 9. The loose and un-grouped articles 5 supplied via the infeed conveyor 3 in the direction of transport T are placed onto the discharge conveyor 9 in the group formation shown in FIG. 3 by the gripper head 8 of the grouping unit 7. During the placing of the articles the discharge conveyor 9 is running continuously in the direction of transport T. Likewise the infeed conveyor is running in the direction of transport T. The infeed conveyor 3 and the discharge conveyor 9 can be controlled independently. Furthermore, the infeed conveyor 3 is provided with a return line 13, supplying articles not processed by the grouping unit 7 back to the infeed conveyor 3 upstream of the grouping unit 7, along a return direction R. Furthermore it is conceivable that a further grouping unit 7 is provided which places support pads (not shown here) on the discharge conveyor 9 in such a way that plural groups of ordered articles can be composed on the support pads one next to the other. In the packaging unit 10 downstream of the discharge conveyor 9 the support pads are folded and/or glued, so that at least two complete handling units are formed in parallel.

Figure 4:
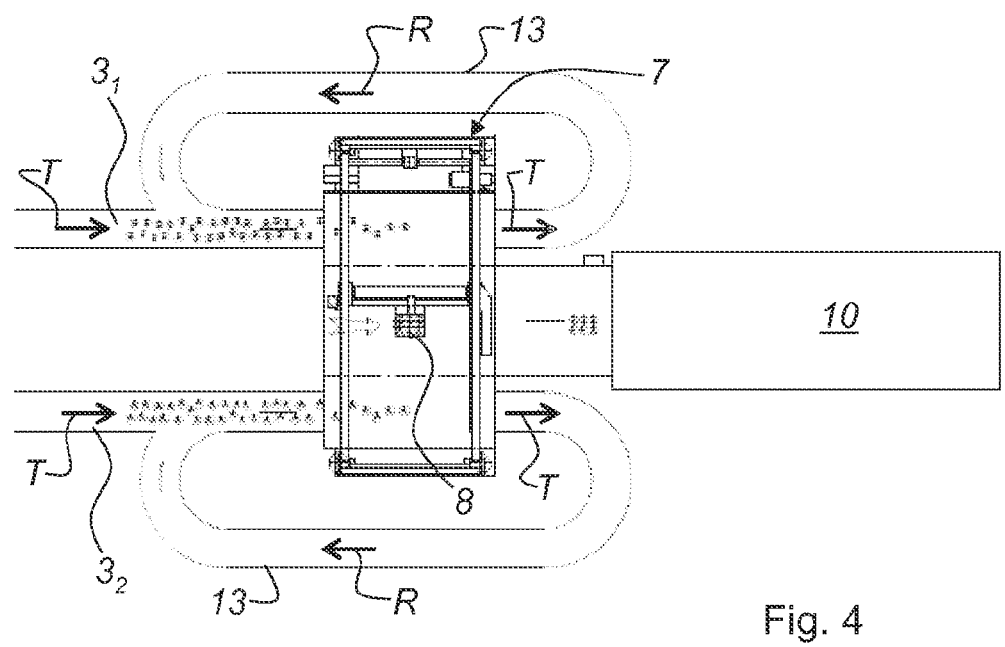
FIG. 4 shows a further embodiment for the ordered compilation of articles, wherein the loose and un-ordered articles are supplied on two infeed conveyors.

FIG. 4 shows a further embodiment of the device 1 for the ordered composition of articles. In the embodiment shown here a first infeed conveyor $3_1$ and a second infeed conveyor $3_2$ are provided. The loose, un-grouped articles 5 are supplied to the grouping unit 7 by the first infeed conveyor $3_1$ and by the second infeed conveyor $3_2$. As shown in FIG. 4, the grouping unit 7 spans the first infeed conveyor $3_1$, the second infeed conveyor $3_2$, and the discharge conveyor 9. The articles 6 grouped without containers are grouped on the discharge conveyor 9 by the grouping unit 7. The embodiment shown in FIG. 4 has the advantage that different types of articles can be supplied to the grouping unit 7 via the first infeed conveyor $3_1$ and the second infeed conveyor $3_2$, respectively. The different types of articles are supplied by production units each producing a different type of article. The articles can then be compiled to groups comprising different types of articles by the grouping unit 7. In this way articles grouped without containers can be compiled to groups comprising different types of articles in an easy manner.

Figure 5:
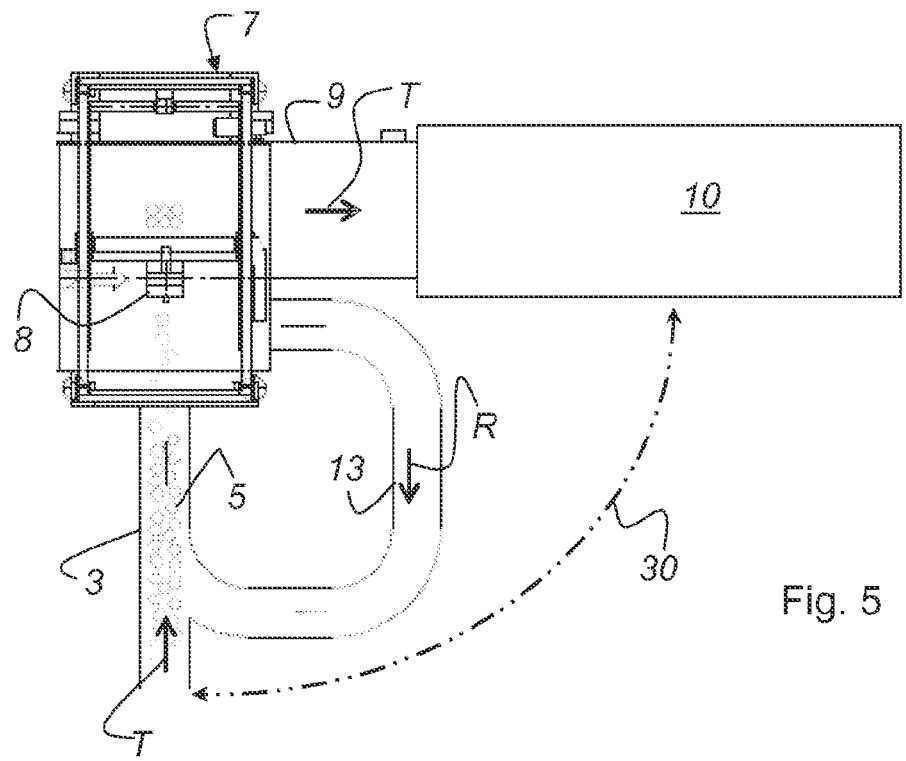
FIG. 5 shows a further embodiment of the device for the ordered compilation of articles, wherein the infeed conveyor is perpendicular to the discharge conveyor.

FIG. 5 shows a further embodiment of the device for the composition of articles to groups of articles. The infeed conveyor 3 here is arranged at an angle 30 to the discharge conveyor 9. Preferentially the angle 30 is a right angle. The embodiment shown in FIG. 5 shows the variability of the present invention. Depending on the spatial conditions at the user's of the device 1 according to the invention, the infeed conveyor 3, the grouping unit 7, and the discharge conveyor 9 can be arranged as required, so that the articles grouped without containers are supplied to a packaging unit. It is obvious that here the direction of transport T of the infeed conveyor 3 is perpendicular to the direction of transport T of the discharge conveyor 9 Likewise a return line 13 is provided, which supplies surplus articles not processed by the grouping unit 7 back to the infeed conveyor 3 upstream of the grouping unit 7 along a return direction R.

Figure 6:
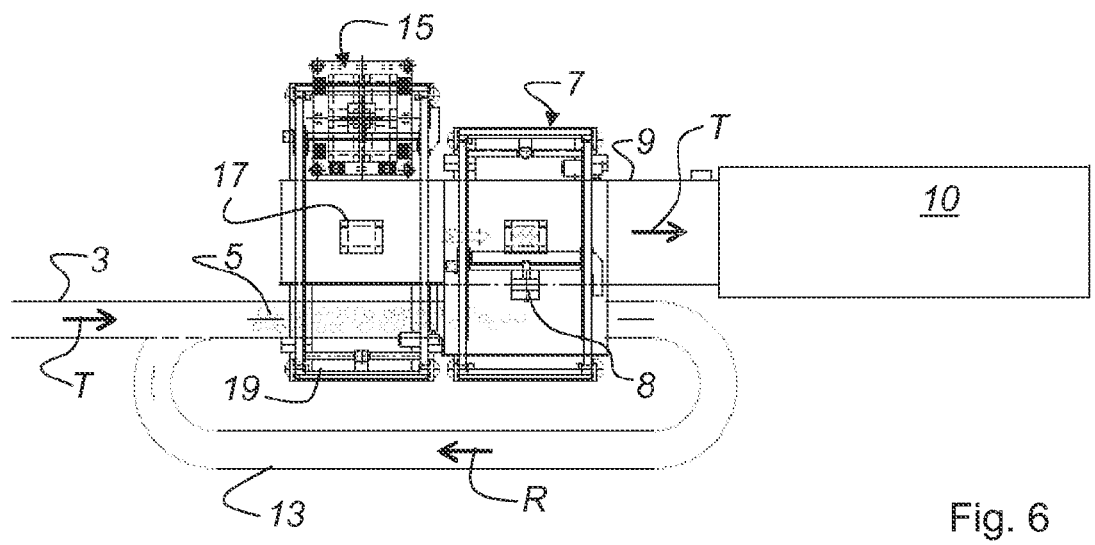
FIG. 6 shows a further embodiment of the device for the ordered compilation of articles, wherein the articles are placed on a support pad on the discharge conveyor.

FIG. 6 shows a further embodiment of the present invention which differs from the embodiments of the FIGS. 1 to 3 in that a magazine 15 for support pads 17 is provided. The grouping unit 7 and the handling system 19 for the support pads 17 are arranged in such a way that both the handling system 19 and the grouping unit 7 span the infeed conveyor 3 and the discharge conveyor 9. The handling system is located upstream of the grouping unit 7. The handling system 19 takes the support pads 17, one at a time, out of the magazine 15 and places them on the discharge conveyor 9. The support pads 17 are transported to the grouping unit 7 in the direction of transport T. The loose, un-grouped articles 5 are transported to the grouping unit 7 by the infeed conveyor 3. The articles are placed in an ordered manner, but without containers, on the support pad 17 by the gripper head 8 of the grouping unit. The device is so variable that it doesn't matter at which position on the discharge conveyor 9 the support pad 17 is located. Image recognition systems or detectors (not shown) are provided, which detect the position of the support pad 17, so that a corresponding control of the grouping unit 7 is possible, in order to place the articles at the correct position on the support pad 17 of the discharge conveyor 9.

Figure 7:
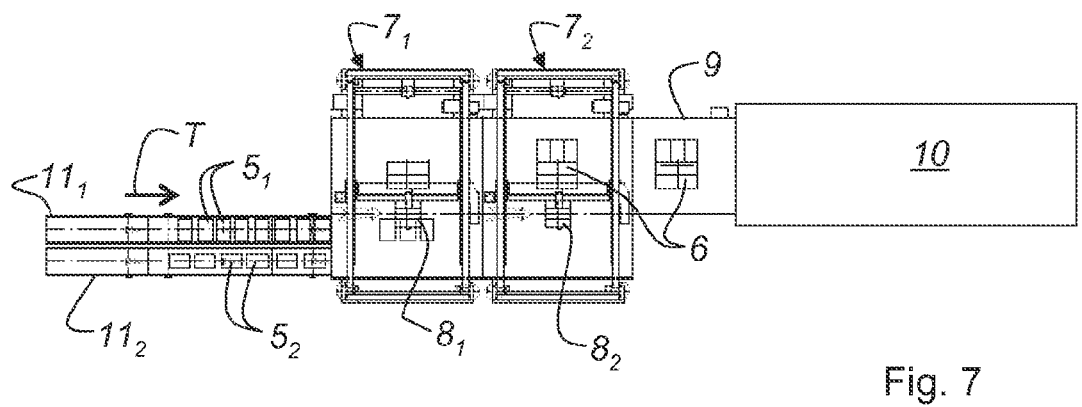
FIG. 7 shows an embodiment in which the articles are supplied in ordered lanes on the infeed conveyor and are grouped to particular positions on the discharge conveyor.

In a further embodiment of the device according to the invention the infeed conveyor 3 supplies the loose, un-grouped articles 5 in an ordered manner to the at least one grouping unit 7 in at least one lane 11. The infeed conveyor 3, in the embodiment shown in FIG. 7, comprises a first lane $11_1$ and a second lane $11_2$. Along the first lane $11_1$ the articles $5_1$ are fed in with a first alignment. Along the second lane $11_2$ the articles $5_2$ are fed in with a second alignment. For displacing the articles $5_1$ or $5_2$, respectively, a first grouping unit $7_1$ and a second grouping unit $7_2$ are provided. The individual grouping units $7_1$ and $7_2$ work in such a way that the first gripper head $8_1$ of the first grouping unit $7_1$ seizes the articles supplied to the first lane $11_1$ of the first grouping unit $7_1$. The second grouping unit $7_2$ with the gripper head $8_2$ seizes the articles supplied to the second grouping unit $7_2$ via the second lane $11_2$. The grouping units $7_1$ and $7_2$ compile an ordered arrangement of the articles on the discharge conveyor 9, the articles eventually being supplied to the packaging unit 10 via the discharge conveyor 9. The pattern according to which the position or group of ordered articles 6 is formed, can be set in an arbitrary manner by the user of the device. This is possible without requiring a change-over of the devices.

Figure 8:
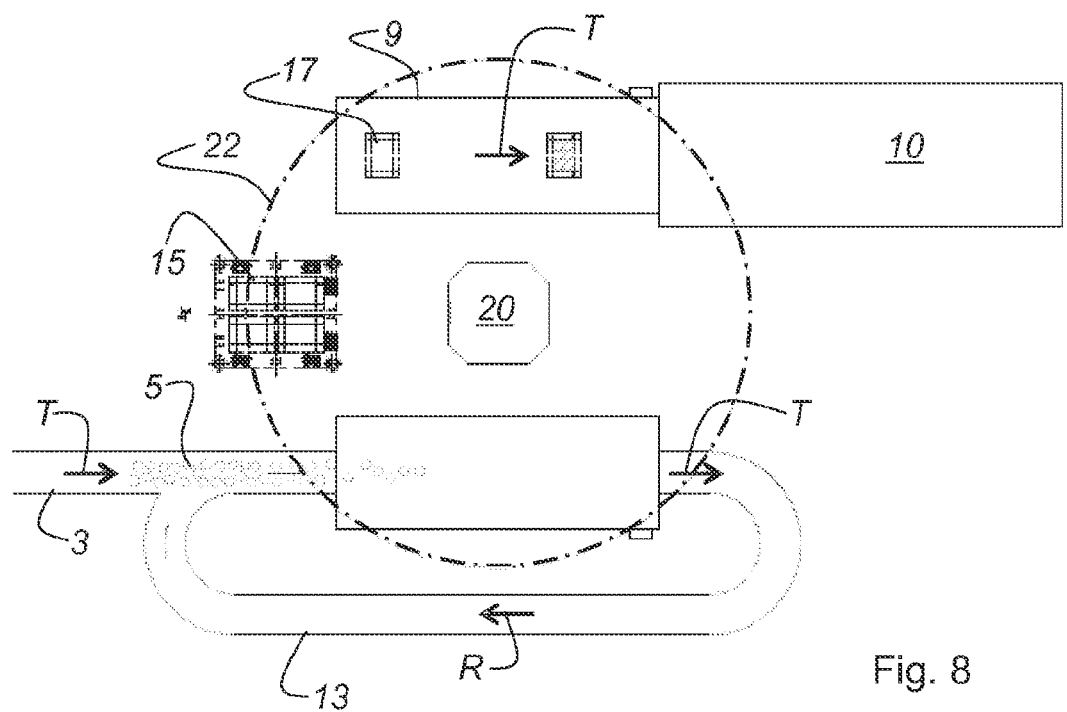
FIG. 8 shows an embodiment of the device according to the invention, wherein a robot is provided between the infeed conveyor and the discharge conveyor.

FIG. 8 shows a further embodiment of the device for the composition of articles without containers. The device also exhibits an infeed conveyor 3 by which the un-ordered articles 5 are brought into the operating range 22 of a robot 20 along a direction of transport T. A discharge conveyor 9 is also assigned to the robot 20. The articles 6 grouped without containers on the discharge conveyor 9 are supplied to the packaging unit 10 by the discharge conveyor 9 along the direction of transport T. Although the direction of transport T of the infeed conveyor and the direction of transport T of the discharge conveyor 9 as shown in FIG. 8 are equal and parallel, this is not to be understood by way of limitation of the invention. It is obvious to a person skilled in the art that the infeed conveyor 3 and the discharge conveyor 9 can be arranged in an arbitrary fashion. The only requirement is that the infeed conveyor 3 and the discharge conveyor 9 are located within the operating range of the respective robot 20, transferring the articles from the infeed conveyor 3 to the discharge conveyor 9. In the embodiment shown here also a magazine 15 for support pads 17 is provided in the operating range 22 of the robot 20. The robot 20 takes support pads 17, one at a time, from the magazine 15 and places them on the discharge conveyor 9. Subsequently the robot 20 groups the articles in a corresponding fashion on the support pad 17. Subsequently the articles 6 grouped without containers on the support pad are supplied to the packaging unit 10 and there are combined into a fixed grouped pack.

The embodiments of the device 1 for the grouped composition of articles shown in FIGS. 1 to 8 only show a small selection of many possibilities for arranging the infeed conveyor 3, the discharge conveyor 9, and the grouping unit 7. If support pads are required for the grouping of articles without containers on the support pads 17 on the discharge conveyor 9, also a magazine 15 may be provided, which is also located in the operating range of the grouping unit 7 or of the robot 20. The supply of support pads (cardboard, plastic, or further suitable materials) in most cases occurs from a storage unit connected outside or below the device 1. If required, individual cuts are taken from the magazine 15 and placed on the discharge conveyor 9 by the gripper head 8 of the grouping unit 7 or of the robot, respectively. The present invention has substantial advantages compared to prior art and thus achieves a considerably higher efficiency of a packaging machine downstream of the device for the composition of articles.

According to the state of the art the supply of products, like for example containers for beverages, which are supplied in a stream, occurs within individual lanes, which are separated from each other by guide plates. The problem here is that products very easily chock amongst themselves when the guide plates are narrowing. With this kind of disruption in most cases a service personnel is necessary to remove the chocking and to continue the stream of products. Also, the use of guide plates requires that these have to be adjusted if products of different dimensions are to be processed, which leads to a downtime of the packaging machine. With the invention it is possible to supply products, cardboards and further adequate objects in a defined way and in a set arrangement to a packaging machine 10. The device for the ordered composition of articles comprises modular units (the infeed conveyor 3, the discharge conveyor 9, and the grouping units 7). The grouping units 7, or the robots 20, respectively, group the articles on the discharge conveyor 9 without containers. Thus it is possible to place products and further suitable means upstream of the packaging unit 10 in a defined manner and set arrangement, and thus to supply them to the packaging unit 10 already in a set arrangement. These modular units are attached to the packaging unit 10, wherein the infeed conveyor 3 and the discharge conveyor 9 for example can be a conveyor belt, a flush grid belt, or similar known means of transport. The grouping unit 7 may be a robot comprising a gripper element. The robot 20 may be a gantry robot and thus may be integrated into the infeed conveyor 3 and the discharge conveyor 9. A free-standing robot 20 is also conceivable (see FIG. 8). The articles or support pads (cardboard) are seized by the gripper head 8 and are placed in a defined manner and set arrangement onto the discharge conveyor of the device 1. The articles ordered in such a way are supplied to the packaging unit 10 by the discharge conveyor 9.

The invention has been described with reference to a preferred embodiment of the invention. Alterations and modifications are conceivable without leaving the scope of the subsequent claims.

What is claimed is:

1. A device for the ordered composition of articles comprising:
   at least one infeed conveyor for loose, un-grouped articles;
   a discharge conveyor for feeding the articles grouped without containers on the discharge conveyor to a packaging unit;
   at least one grouping unit for seizing the loose, un-grouped articles from the infeed conveyor and for placing and feeding the articles on the discharge conveyor;
   a handling unit or at least one robot with an operating area respectively; and
   at least one magazine for support pads which is arranged in the operating area of the at least one grouping unit or robot respectively, such that at least one support pad is removable from the at least one magazine and placeable on the discharge conveyor and the articles can be grouped on the support pad by the handling unit or the at least one robot.

2. Device of claim 1, wherein the grouping unit is configured as a gantry robot, wherein the gantry robot spans the infeed conveyor and the discharge conveyor.

3. The device of claim 2, wherein the magazine is arranged above the handling unit.

4. Device of claim 1, wherein the infeed conveyor and the discharge conveyor exhibit an identical direction of transport.

5. Device of claim 1, wherein the infeed conveyor is arranged at an angle to the discharge conveyor.

6. Device of claim 5, wherein the infeed conveyor is arranged at a right angle to the discharge conveyor.

7. Device of claim 1, wherein the infeed conveyor comprises at least one lane, via which the loose, un-grouped articles are fed to the grouping unit in an ordered fashion.

8. Device of claim 1, wherein the at least one infeed conveyor is provided with a return line, via which un-grouped articles not passed on to the discharge conveyor are again fed to the infeed conveyor upstream of the grouping unit.

9. The device of claim 1, wherein the grouping unit and the handling unit for the support pads are arranged in such that both the handling unit and the grouping unit span the infeed conveyor and the discharge conveyor.

10. Device of claim 9, wherein the grouping unit or the handling unit is configured as a robot, wherein the infeed conveyor and the discharge conveyor are located in an operating range of the robot.

11. Device of claim 10, wherein at least one magazine for support pads is provided in the operating area of the at least one robot.

12. The device of claim 9, wherein at least one of the grouping unit and the handling unit are configured as a gantry robot, wherein the gantry robot spans each of the infeed conveyor and the discharge conveyor.

13. The device of claim 12, wherein the magazine is arranged above the handling unit.

14. The device of claim 1, wherein a gripper head of the grouping unit is controlled by a evaluation and control unit, in order to seize the articles from the infeed conveyor and to place them at an intended position on the discharge conveyor and an image capture system is used to monitor the seizing and placing of the articles.

15. The device of claim 1, wherein a storage unit for support pads is provided, which is connected outside or below the device.

16. A method for the ordered composition of articles, comprising the following steps:
   feeding loose, un-grouped articles to at least one grouping unit by at least one infeed conveyor;
   removing at least one support pad from at least one magazine for support pads by a handling unit or at least one robot;
   placing the at least one support pad on a discharge conveyor by the handling unit or at least one robot;
   grouping the un-grouped articles on the at least one support pad on the discharge conveyor by the at least one grouping unit; and
   feeding articles in containerless groups on at least one support pad, respectively to a packaging unit by the discharge conveyor.

17. Method of claim 16, wherein un-grouped articles, not passed on to the discharge conveyor, are again fed to the infeed conveyor via at least one return line.

18. Method of claim 16, wherein a grouped pack out of plural unordered articles is produced by feeding loose but grouped articles to a packaging unit.

19. The method of claim 16, wherein a gripper head of the grouping unit is controlled by a evaluation and control unit for seizing the articles from the infeed conveyor and for placing the articles at an intended position on the discharge conveyor, wherein the seizing and placing of the articles is monitored by an image capture system.

* * * * *